United States Patent [19]

Anderson et al.

[11] Patent Number: 4,996,492

[45] Date of Patent: Feb. 26, 1991

[54] PROBE FOR INSPECTING COUNTERSUNK HOLES IN CONDUCTIVE BODIES

[75] Inventors: Patrick L. Anderson, Bellevue; Dennis P. Sarr, Kent; Mark B. Simpson, Everett, all of Wash.

[73] Assignee: The Boeing Company, Seattle, Wash.

[21] Appl. No.: 320,314

[22] Filed: Mar. 7, 1989

[51] Int. Cl.⁵ ............................................. G01R 27/26
[52] U.S. Cl. ................................... 324/687; 324/688; 324/690; 324/662
[58] Field of Search ................ 324/61 R, 61 P, 661, 324/662, 687, 688, 690; 340/870.37

[56] References Cited

U.S. PATENT DOCUMENTS

| | | | |
|---|---|---|---|
| 2,076,944 | 4/1937 | Howe | 324/61 R X |
| 2,512,879 | 6/1950 | Roggenstein | 324/61 R |
| 2,930,976 | 3/1960 | Hirdler | 324/61 R |
| 3,189,268 | 6/1965 | Nilsson | 324/61 R |
| 3,257,591 | 6/1966 | Hardy et al. | 324/61 R |
| 3,426,272 | 2/1969 | Griffin | 324/61 R |
| 3,867,691 | 2/1975 | Plessis | 324/61 R |
| 4,112,355 | 9/1978 | Gibson, Jr. et al. | 324/61 R X |
| 4,168,465 | 9/1979 | Prince | 324/61 P |
| 4,295,092 | 10/1981 | Okamura | 324/61 R |
| 4,451,780 | 5/1984 | Ogasawara | 324/61 R |
| 4,814,691 | 3/1989 | Garbini et al. | 324/61 P |

FOREIGN PATENT DOCUMENTS 2100441  6/1981  United Kingdom ............. 324/61 R

OTHER PUBLICATIONS

Getex, You Can Make 192 Quality Checks On Anyone of These Holes in Just 3 Seconds!, Advertising Brochure.
Hood, W. R., "Capacitive Probe System for Fastener Hole Inspection," Presented at Conference of the Proceedings of Southeastern '78 Region III in Atlanta, Ga., Apr. 10-12, 1978.
Yee, S. Y., "Variable Capacitance Signal Transduction and the Comparison with Other Transduction Schemes," *Instrumentation*, vol. 3, May 1970 (10 pages).

*Primary Examiner*—Gerard R. Strecker
*Assistant Examiner*—Jack B. Harvey
*Attorney, Agent, or Firm*—Christensen, O'Connor, Johnson & Kindness

[57] ABSTRACT

A probe (20) that inspects a countersunk hole (21) in a conductive body, such as an aircraft part (22), is provided. A plurality of nested cylinders form an electrode cartridge (54) with a countersink portion (74) having a frustoconical shape and a hole portion (76) having a cylindrical shape. A plurality of lower hole electrode strips (72) are mounted on a lower hole cylinder (110) and a plurality of upper hole electrode strips (70) are mounted on an upper hole cylinder (116). A plurality of lower countersink electrode strips (68) are coupled to a lower countersink cylinder (124) and a plurality of upper countersink electrode strips (66) are coupled to an upper countersink cylinder (132). A dielectric layer (64) covers a plurality of measuring electrode tips (67, 69, 71 and 73) and an outer surface (150) of the hole and countersink portions (76 and 74). A grounding electrode (158) is mounted on the upper hole cylinder (116). A ground wire (162) is coupled to the grounding electrode (158) and extends beyond the dielectric layer (64). When probe (20) is inserted into the countersunk hole (21), the countersunk hole (21) is grounded by the ground wire (162). A charging current applied to the measuring electrode strips (66, 68, 70 and 72) in a sequential manner, causes the measuring electrode tips (67, 69, 71 and 73) form fringe field capacitors with the ground wall of the countersunk hole (21). The fringe field capacitors charge up at a rate dependent, in part, upon the distance between the probe (20) and the wall of the countersunk hole (21). Sufficient rate measurements are made of the distance between the probe (20) and the wall of the countersunk hole (20) to permit another device (30) to determine whether the geometry and orientation of the countersunk hole (21) are within engineering specifications.

24 Claims, 6 Drawing Sheets

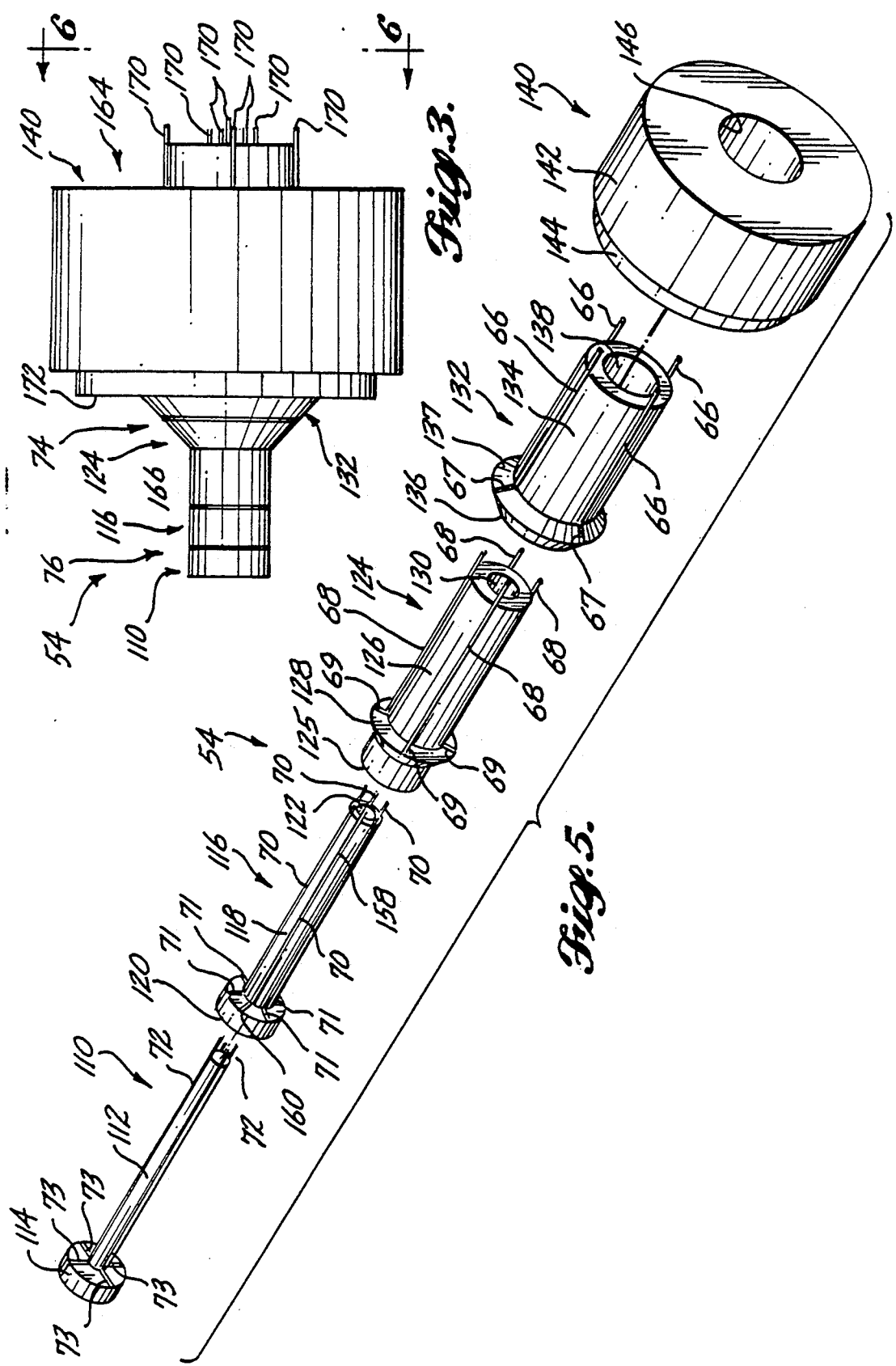

PROBE FOR INSPECTING COUNTERSUNK HOLES IN CONDUCTIVE BODIES

FIELD OF THE INVENTION

This invention relates to inspecting apparatus and, more particularly, to an apparatus for inspecting the geometry and orientation of a countersunk hole in a conductive body.

BACKGROUND OF THE INVENTION

Many parts of an aircraft are held together by mechanical fasteners, such as rivets or bolts, as opposed to welds or other "permanent"-type connections. Mechanical fasteners can be removed so that the aircraft parts can be disassembled when, and if, the need arises. Typically, these fasteners are formed of a head on one end of a shaft. In most cases, the shaft is a substantially cylindrical shape and the head is a frustoconical shape. Accordingly, the aircraft part must have a countersunk hole for receiving the fastener. That is, the countersunk hole must have a hole for receiving the shaft of the fastener and a countersink for receiving the head of the fastener.

It is critical to the aircraft manufacturing industry that a fastener fit properly into a countersunk hole. Properly fitting fasteners provide structural integrity to the aircraft by securely holding parts together. In addition, where a fastener is inserted into an external part, such as the skin of the aircraft, a fastener must sit flush with the surface of the part so that the aerodynamic qualities of the part surface are maintained. Conversely, the structural integrity and aerodynamic surfaces of the aircraft may be impaired by fasteners that do not fit properly into countersunk holes.

The hole and countersink must have appropriate geometries to ensure the fastener will be properly received. The hole should have a cylindrical shape and have a diameter substantially equal to the shaft diameter. Likewise, the countersink should have a frustoconical shape and have a depth and diameter substantially equal to the height and diameter of the head. Clearly, assuming the fastener is made to specifications, if the countersink is the wrong shape or size, the head of the fastener may not sit flush with the part surface. Likewise, if the hole is the wrong shape or size, the fastener may not fit into the hole at all, or there may be an unacceptable amount of "play" between the part and the shaft of the fastener. In any event, the structural integrity and aerodynamic surfaces of the aircraft may be adversely affected by an ill-fitting fastener.

In addition to having the proper geometry, the hole and countersink must also have the proper orientation with respect to each other and the aircraft part to ensure the fastener will fit properly. In most cases the shaft and head of a fastener are coaxial. To ensure a proper fit, the hole and countersink of a particular countersunk hole must also be coaxial. Furthermore, to ensure the head sits flush with the part surface, the hold and countersink should be normal to the part surface. Accordingly, if the hole and countersink are not coaxial, or if they are coaxial, but are not normal to the part surface, the fastener may not fit properly into the countersunk hole and, as a result, the structural integrity of the aircraft and the aerodynamic surfaces may be adversely affected.

There is no known apparatus presently available in the aircraft manufacturing industry for automatically inspecting a countersunk hole to determine whether the geometry, as well as the orientation of the hole and countersink are within engineering specifications. Current industry practice calls for manufacturing personnel to manually insert a fastener into a countersunk hole and make a visual inspection of the fit. If the fastener does not appear to fit properly, e.g., the head of the fastener is not flush with the part surface, or the shaft does not fit into the hole, the hole and/or countersink may be redrilled in an attempt to correct the problem. Visual inspection is a relatively inexact method of inspection that is subject to errors and oversights, which may threaten the structural integrity and aerodynamic performance of the aircraft. It is desirable to detect these problems early in the maufacturing process because the cost of correcting the problems is less than when the problems are detected, and corrected, later in the manufacturing process. The inaccurate nature of visual inspection may result in these problems being overlooked, which, in turn, may result in more costly corrections later in the manufacturing process. Considering the large number of fasteners that are inserted into countersunk holes in an aircraft, the cost and opportunity for error with such a method become even more significant.

As a result, there has developed a need in the aircraft manufacturing industry for an apparatus that will automatically inspect a countersunk hole in conductive aircraft part and determine whether the geometry and the orientation of the countersunk hole are within engineering specifications. The present invention provides a capacitance probe having a novel configuration that permits the probe to be inserted into a countersunk hole. A fringe field capacitance technique is used to measure the distance between the probe and the walls of the hole and countersink of a countersunk hole. The probe provides adequate measurement information to permit another device, which does not form a part of this invention, to compute the geometry and orientation of the countersunk hole and determine if the countersunk hole is within engineering specifications. An example of such a device can be found in a contemporaneously filed U.S. patent application Ser. No. entitled "Method and Apparatus for Measuring the Distance Between a Body and a Capacitance Probe," by Dennis P. Sarr and Patrick L. Anderson, application Ser. No. 07/320,315, the subject matter of which is incorporated herein by reference.

SUMMARY OF THE INVENTION

In accordance with the present invention, a probe for use in inspecting countersunk holes in conductive bodies is provided. The probe is designed to be used with electronic apparatus that use a fringe field capacitance technique to measure distances between the probe and the countersunk hole when the probe is inserted into the countersunk hole. The probe comprises: a housing; and, an electrode cartridge. The electrode cartridge has a fastener-like shape and is, preferably, releasably attached to the housing. The electrode cartridge includes: a plurality of measuring electrodes; at least one grounding electrode; and, an electrical connector. The plurality of measuring electrodes and the at least one grounding electrode are embedded in the electrode cartridge. First ends of the plurality of measuring electrodes form the points of a plurality of fringe field capacitors. A first end of the at least one grounding electrode protrudes from the electrode cartridge. Second ends of the plurality of measuring electrodes and at least one grounding electrode are connected to the electrical connector. When the electrode cartridge is inserted into a countersunk hole in a conductive body, the first end of the at least one grounding electrode contacts the wall of the countersunk hole. As a result, a plurality of fringe field capacitors are formed between the probe and the wall of the countersunk hole. When connected to an appropriate control unit, which does not form a part of the present invention, the plurality of electrodes provide adequate measurement information to permit the control unit to determine the geometry and orientation of the countersunk hole.

In accordance with further aspects of the invention, the first ends of the plurality of measuring electrodes are arranged in a plurality of parallel, spaced-apart circumferential rows about the electrode cartridge.

In accordance with still further aspects of the invention, the fastener-like shape of the electrode cartridge comprises a countersink portion and a hole portion. The countersink portion has a frustoconical shape and the hole portion has a cylindrical shape. The countersink and hole portions are coated with a dielectric layer. A plurality of countersink electrodes have first ends embedded in the countersink portion of the electrode cartridge. A plurality of hole electrodes have first ends embedded in the hole portion of the electrode cartridge. The first ends of the plurality of countersink and hole electrodes are covered by the dielectric layer. The first end of the grounding electrode extends beyond the dielectric layer.

In accordance with still further aspects of the invention, the electrode cartridge is formed of a plurality of concentrically nested cylinders. The countersink portion of the electrode cartridge is formed of lower and upper countersink cylinders and the hole portion of the electrode cartridge is formed of lower and upper hole cylinders. A plurality of lower and upper countersink electrodes mounted on the lower and upper countersink cylinders form the plurality of countersink electrodes. A plurality of lower and upper hole electrodes mounted on the lower and upper hole cylinders form the plurality of hole electrodes. The grounding electrode is mounted on the upper hole cylinder.

In accordance with still further aspects of the invention, the plurality of measuring electrodes and the at least one grounding electrode are vapor deposited on the lower and upper countersink cylinders and on the lower and upper hole cylinders.

As will be appreciated from the foregoing summary, the present invention is a probe that can be used to inspect the geometry and orientation of countersunk holes in conductive bodies. The probe has a fastener-like shape that permits the probe to be inserted into a countersunk hole. The probe is used with an electronic apparatus that uses a fringe field capacitance technique to measure the distance between the apparatus and the wall of the countersunk hole at a plurality of points so that the electronic apparatus, which does not form a part of this invention, can determine if the geometry and orientation of the countersunk hole are within engineering specifications.

BRIEF DESCRIPTION OF THE DRAWINGS

The foregoing and other features and advantages of this invention will become more readily appreciated as the same becomes further understood by reference to the following detailed description when taken in conjunction with the accompanying drawings wherein:

FIG. 3 is an elevation of an electrode cartridge suitable for use in the probe depicted in FIG. 2;

FIG. 5 is an exploded isometric view of the cylinders depicted in FIGS. 4A-4E illustrating the arrangement of electrodes on the cylinders;

DETAILED DESCRIPTION OF THE PREFERRED EMBODIMENT

Figure 1A:
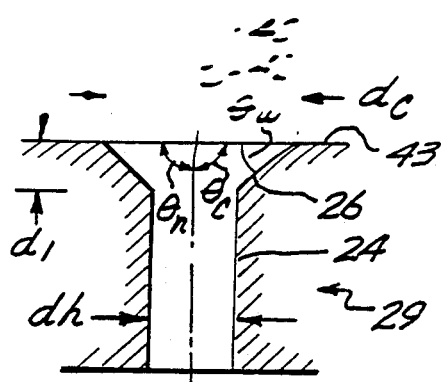
FIGS. 1A-1H are a series of sectional views of a part with a countersunk hole that illustrate various geometry and orientation problems associated with the countersunk hole.

In the aircraft manufacturing industry there has developed a need for an inspection apparatus that will provide sufficient measurement information regarding the geometry and orientation of a countersunk hole in an aircraft part. Ideally, the apparatus will include a probe for insertion into holes to be inspected and a downstream electronic system suitable for analyzing the measurement information generated by the probe and determining whether the geometry and orientation of the countersunk hole are within engineering specifications. Ideally, the probe should be easy to use and small enough to permit its use in hard-to-reach places. As will become better understood from the following discussion, the present invention is a sensing probe that uses a fringe field capacitance technique to achieve these results. A suitable downstream electronic system is described in contemporaneously filed U.S. patent application Ser. No. 07/320,315, entitled "Method and Apparatus for Measuring the Distance Between a Body and a Capacitance Probe," by Dennis P. Sarr and Patrick L. Anderson, the subject matter of which is incorporated herein by reference.

Fringe field capacitance is well known in the metrological art. Fringe field capacitance techniques are commonly used for inspecting cavities (e.g., cylindrical holes) and surfaces of conductive bodies. Accordingly, these techniques are not discussed in detail herein; however, in order to more fully understand the present invention, a brief discussion of fringe field capacitance and how it is used in the present invention is set forth next. There are two basic types of capacitance techniques used in the metrological art: a plate capacitance technique; and, the fringe field capacitance technique noted above. In the plate capacitance technique, plates form the two sides of a capacitor used to make measurements. The surface areas of the plates are substantially larger than the distance between plates. The capacitance between the plates is uniformly distributed between the plates. Because of the relatively large surface areas of the plates and the uniformity of the capacitance between the plates, the plate capacitance technique is well suited for measuring, for example, an average distance between the plates. Contrariwise, the plate capacitance technique is less well suited for making precise measurements of the distance between specific points on the plates.

The fringe field capacitance technique uses the capacitance formed between a point source and a plate to make distance measurements. The point source may be an edge of a plate or a tip of an electrode whose dimensions are small relative to the distance between the point source and the plate. The capacitance between the point source and the plate is commonly referred to as fringe field capacitance. Fringe field capacitance is highly directional and, therefore, well suited for making precise measurements of the distance between the point source and a small area on the plate. The capacitor formed by the point source and the plate is commonly referred to as a fringe field capacitor.

The present invention uses the fringe field capacitance technique instead of the plate capacitance technique because it offers a greater degree of accuracy and precision in determining the geometry and orientation of countersunk holes in conductive bodies. Also, since fringe field capacitors are typically smaller than plate capacitors, the fringe field capacitance technique permits the measuring probe to be smaller than it would be if the plate capacitance technique was used. Furthermore, since fringe field capacitors are smaller, the charging currents and charge times are correspondingly less than they would be with plate capacitors. Because the fringe field capacitance technique is used, probes formed in accordance with the present invention are more accurate, smaller, faster and less costly to operate than they would be if the plate capacitance technique was used.

Before describing the present invention, some typical countersunk hole problems, which may be detected with the present invention, are discussed. FIGS. 1A–1H illustrate a countersunk hole 21 that has been drilled into part 29, such as an aircraft part, for example. The part 29 has a smooth, aerodynamic surface 43. As discussed in greater detail below, FIG. 1A illustrates a perfect countersunk hole 21, while FIGS. 1B–1H illustrate various imperfections in the geometry and orientation of the countersunk hole 21.

Turning first to FIG. 1A, the perfect countersunk hole 21 is formed of a hole 24 and a countersink 26. The hole 24 has a cylindrical shape with a diameter, $d_h$. The countersink 26 has a frustoconical shape with a diameter, $d_c$, at the surface 43 and a depth, $d_1$. The values of $d_h$, $d_c$ and $d_1$ are determined by the size of a fastener (not shown) that is to be inserted into the countersunk hole 21. Such a fastener, as is well known in the art, is typically formed of a cylindrical shaft and a frustoconical head. Thus, for the perfect countersunk hole 21, $d_h$ is substantially equal to the diameter of the shaft, $d_c$ is substantially equal to the diameter of the head, and $d_1$ is substantially equal to the height of the head of the fastener.

The hole 24 and the countersink 26 are coaxial and normal to the part surface 43 surrounding the countersink 26. Accordingly, a hole centerline angle, $\theta_h$, measured between the part surface 43 and the longitudinal centerline 40 of the hole 24 is substantially 90°. Likewise, a countersink centerline angle, $\theta_c$, measured between the part surface 43 and the longitudinal centerline 42 of the countersink 26 is also substantially 90°. Additionally, a wall angle, designated $\theta_w$, measured between a wall of the countersink 26 and the part surface 43 is substantially equal to the angle of the frustoconical-shaped head of the fastener. A fastener sized the same as the perfect countersunk hole 21 illustrated in FIG. 1A will securely join the part 29 to another component, such as another aircraft component (not shown), when the top of the fastener is substantially flush with the part surface 43, i.e., when the fastener countersink region fills the countersink portion of the countersunk hole and the fastener shank region fills the remainder of the hole.

Figure 1E:
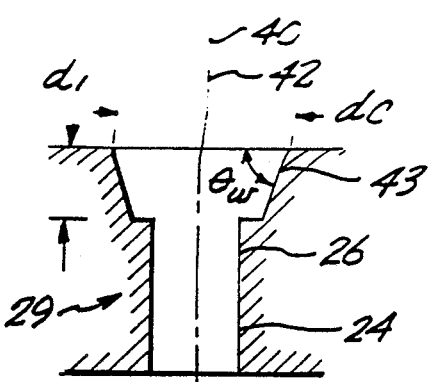
Figure 1B:
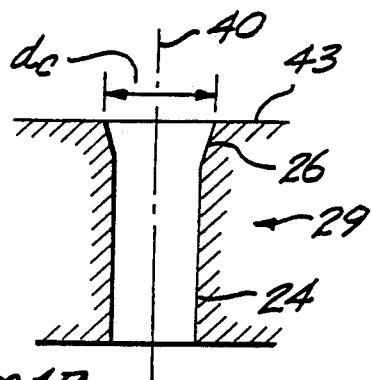

FIG. 1B illustrates a countersunk hole 21 with the wrong countersink diameter, $d_c$. That is, the countersink diameter is not substantially equal to the diameter of the fastener head. If the countersink diameter is too small, the head will not sit entirely within the countersink 26. Rather, the head will protrude above the surface 43. Contrariwise, if the countersink diameter is too large, the head will not entirely fill the countersink 26. In either case, the part surface 43 will not be smooth, whereby its aerodynamic properties will be disrupted. Furthermore, if the countersink diameter is too small, the fastener may not extend through the countersunk hole 21 far enough to properly secure the part 29 to another aircraft component, thereby threatening the structural integrity of the aircraft.

Figure 1F:
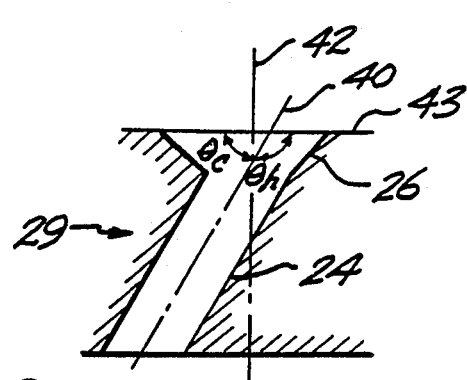
Figure 1C:
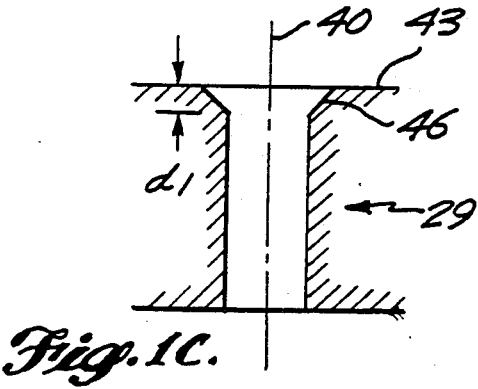
Figure 1G:
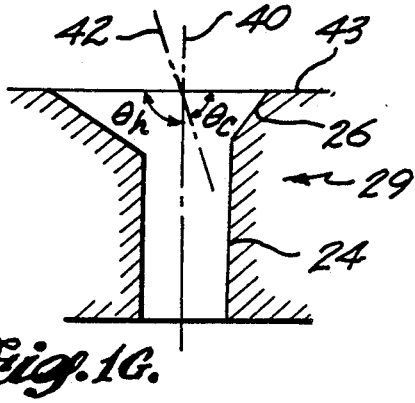
Figure 1D:
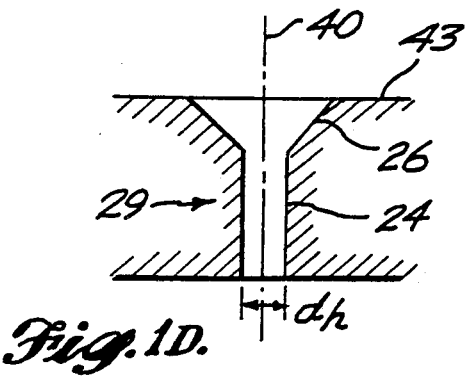

FIG. 1C illustrates a countersunk hole 21 with the wrong countersink depth, $d_1$. That is, the countersink depth is not substantially equal to the height of the fastener head. If the countersink depth is too shallow or too deep, the fastener head will protrude above or possibly sit below the part surface 43. FIG. 1D illustrates a countersunk hole 21 with the wrong hole diameter, $d_h$. That is, the hole diameter is not substantially equal to the diameter of the fastener shaft. If the hole diameter is too small, the shaft will not fit into the hole 24. Contrariwise, if the hole diameter is too large, there may be too much space between the fastener shaft and the part 29 for the fastener to hold the part 29 securely. FIG. 1E illustrates a countersunk hole 21 with the wrong wall angle, $\theta_w$. That is, the wall angle does not match the corresponding head angle of the fastener. As a result, the fastener head may not sit flush with the surface 43. Thus, FIGS. 1B–1E, illustrate various abnormalities with a hole 24 and a countersink 26 that may adversely affect the structural integrity of the aircraft and the aerodynamics of the part surface 43.

Figure 1H:
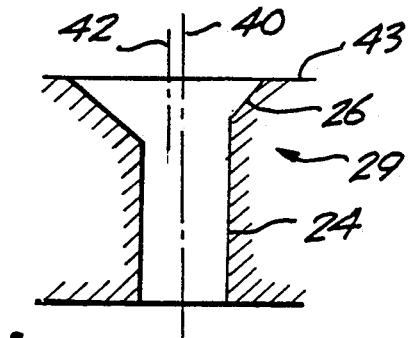

As noted above, the hole 24 and countersink 26 of a particular countersunk hole 21 must have the proper orientation with respect to each other and the part surface 43 to ensure the fastener is properly received by the countersunk hole 21. That is, the hole 24 and the countersink 26 should be coaxial and normal to the part surface 43. FIGS. 1F–1H illustrate a few types of orientation problems that may exist with a countersunk hole 21, and which are briefly discussed next.

FIG. 1F illustrates a hole 24 and countersink 26 that are not coaxial. More specifically, the countersink 26 is normal to the part surface 43, but the hole 24 is not. Clearly, the head of a fastener inserted into this countersunk hole 21 will not sit flush with the part surface 43. FIG. 1G illustrates the reverse situation of that depicted in FIG. 1F, namely, a hole 24 that is normal to the part surface but a countersink 26 that is not. This condition produces an eccentric countersink 26 that will not permit the fastener head to sit flush with the part surface 43. FIG. 1H illustrates a situation in which the hole 24 and countersink 26 are normal to the part surface 43 but are not coaxial. Accordingly, the fastener head will not sit flush with the part surface 43. FIGS. 1B–1H are merely some examples of the geometry and orientation problems that may exist with a countersunk hole 21 and should not be considered to be exhaustive of such problems.

As can be readily appreciated from the foregoing discussion, there are numerous situations where an improperly drilled countersunk hole 21 may prevent a fastener from being properly received and, as a result, may adversely affect the structural integrity and aerodynamic surfaces of an aircraft. As will become better understood from the following discussion, a probe 20 formed in accordance with the present invention provides a manufacturer, aircraft or otherwise, with a quick and accurate way to detect and identify a problem with a countersunk hole 21 so that the problem can be corrected.

Figure 2:
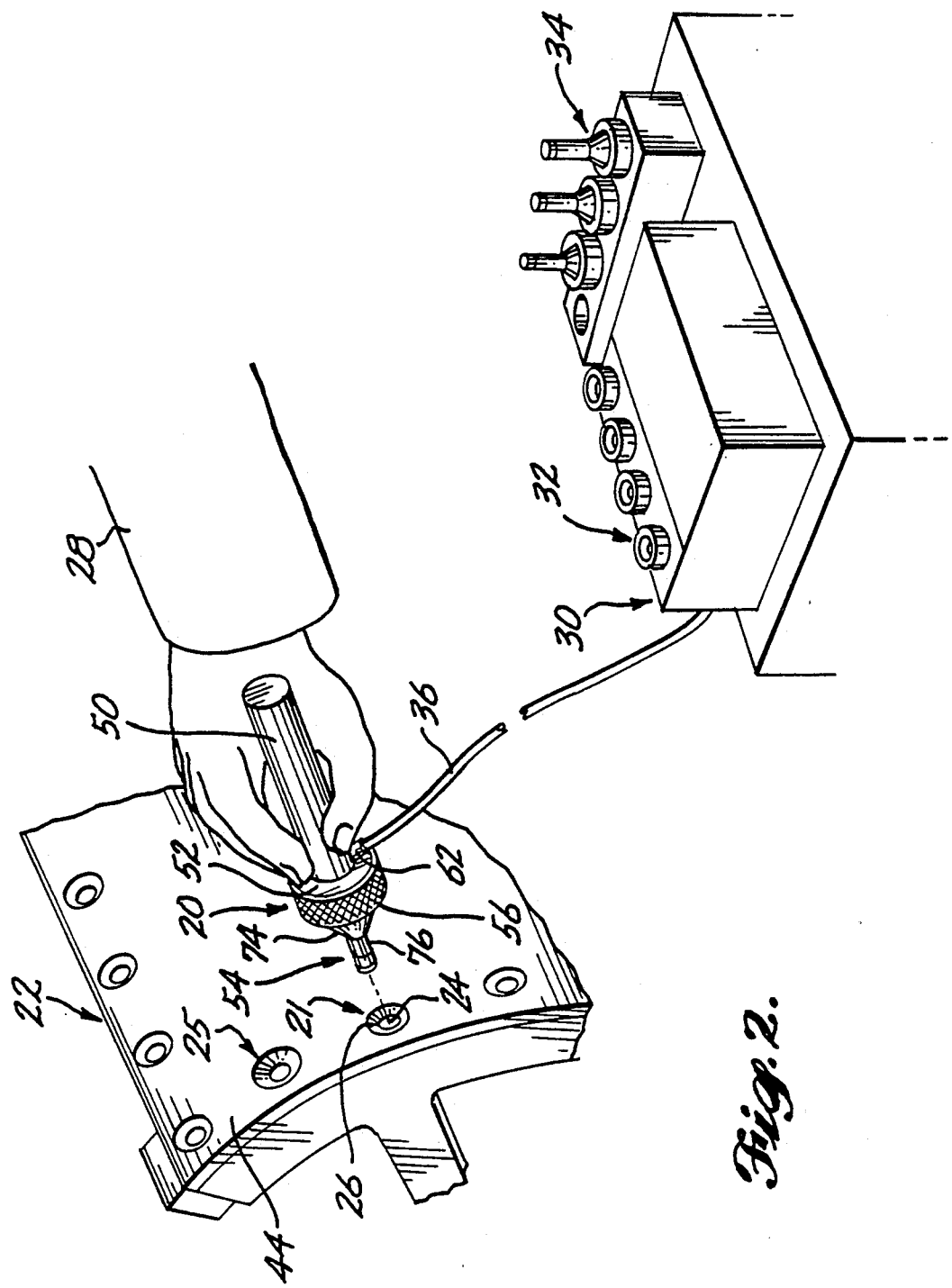
FIG. 2 is a pictorial view of an exemplary application of a probe formed in accordance with the present invention.

FIG. 2 illustrates a preferred embodiment of the invention in the form of a hand-held probe 20. FIG. 2 further illustrates a potential use of the probe 20 in a typical aircraft manufacturing application. The probe 20 includes an elongated, cylindrical handle 50 that is preferably of a size and shape that permits it to be easily held in the hand of an operator 28. A cartridge housing 52 is attached to one end of the handle 50. The cartridge housing 52 contains an electrode cartridge 54 that is held in place by a retaining ring 56. The electrode cartridge 54 protrudes from an end of the cartridge housing 52 located opposite to the end attached to the handle 50. The protruding end of the electrode cartridge 54 includes a countersink portion 74 and a hole portion 76, the significance of which will be discussed below. The probe 20 is connected to a control unit 30, which does not form a part of the present invention, via a cable 36. A suitable control unit is described in U.S. patent application Ser. No. 07/320,315, more fully referenced above and incorporated herein by reference.

To inspect a countersunk hole 21 in an aircraft part 22 formed of a homogeneous conductive material, the operator 28 holds the probe 20 by the handle 50 and inserts the electrode cartridge 54 into the countersunk hole 21, which is formed of a hole 24 and a countersink 26. When the electrode cartridge 54 is inserted into the countersunk hole 21, the countersink portion 74 of the electrode cartridge 54 is received by the countersink 26 and the hole portion 76 is received by the hole 24. To achieve this, the countersink portion 74 has a frustoconical shape and the hole portion 76 has a cylindrical shape.

In accordance with the invention, the electrode cartridge 54 is sized to fit a particular size countersunk hole 21. That is, the diameter of the hole portion 76 is substantially equal to the diameter of the hole 24. Likewise, the frustoconical shape and size of the countersink portion 74 are substantially equal to the frustoconical shape and size of the countersink 26. Accordingly, different size electrode cartridges 34 must be used for different size countersunk holes 25. Preferably, the probe 20 is constructed so that the electrode cartridge 54 can be removed from the cartridge housing 52 by simply unscrewing and removing the retaining ring 56. Once the cartridge 54 has been removed from the housing 52, a different size electrode cartridge 34 can be inserted into the cartridge housing 52 and secured by the retaining ring 56.

As noted above and discussed more fully below, the electrode cartridge 54 uses a fringe field capacitance technique to determine the geometry and orientation of the countersunk hole 21. Electrodes (not shown in FIG. 1) are embedded in the electrode cartridge 54 and form fringe field capacitors with the countersunk hole 21. That is, each of the electrodes in the electrode cartridge 54 form the point source of a fringe field capacitor and the side wall of the countersunk hole 21 forms the opposite plate of the fringe field capacitor. (As noted above, the countersunk hole is formed in a homogeneous conductive body.) Further, as will become better understood from the following discussion, the side wall of the countersunk hole is grounded. Each of the electrodes is bonded to a conventional connector pin 170 (FIG. 3). A mating receptacle (not shown) in the cartridge housing 52 receives the connector pins when the electrode cartridge 54 is inserted into the cartridge housing. The cable 36 is connected to the mating receptacle.

The control unit 30 applies a charging current to an electrode via the cable 36. The fringe field capacitor formed by the electrode receiving the charging current and the wall of the countersunk hole 21 begins to charge at a rate determined, in part, by the distance between the electrode and the wall of the countersunk hole 21. This charging rate is translated by the control unit 30 into a measurement of the distance between the electrode and the wall of the countersunk hole 21. Since the dimensions of the cartridge 54 can be readily determined, the dimensions, i.e., the geometry, of the hole 24 and countersink 26 can be obtained from a number of electrode distance measurements. Furthermore, as will also be discussed below, when the electrode cartridge 54 is placed in the countersunk hole 21, it is positioned normal to the surrounding surface 44 of the part 22. Accordingly, the probe generated information can also be used to determine the orientation of the hole 24 and countersink 26 relative to each other and to the part 22.

In order to determine whether the geometry and orientation of a countersunk hole 21 are within engineering specifications, the distance measurements obtained by the probe 20, when it is inserted into a countersunk hole 21, are compared to distance measurements obtained by the probe 20 when it is inserted into a "calibrated" countersunk hole 32. More specifically, before a countersunk hole 21 of a particular size is measured, the probe 20 is inserted into a calibrated countersunk hole 32 having the same nominal dimensions and same material properties as the countersunk hole 21 would have if it had a perfect size and shape. The calibrated distance measurements taken by the probe 20 when it is inserted into the calibrated countersunk hole 32 form standard measurements that are used by the control unit 30 to determine whether the countersunk hole 21 is within engineering specifications. Preferably, the calibrated distance measurements need only be taken by the probe 20 before the first countersunk hole 21 of any particular size is inspected. Distance measurements from subsequently inspected countersunk holes 21 of the same size are compared to the calibrated distance measurements.

In accordance with the preferred embodiment of the invention, the electrode cartridge 54 has the general form depicted in FIG. 3. The electrode cartridge 54 has a front end 166 and a back end 164. The front end 166 includes the countersink portion 74 and the hole portion 76 noted above and a resting surface 172. As will become better understood from the following discussion, the resting surface 172 is brought into contact with the part surface 44 when the probe 20 is inserted into a countersunk hole 21. The resting surface 172 keeps the probe 20 normal to the part surface 44. The back end 164 of the cartridge 54 includes connector pins 170, which are connected to electrodes (not shown in FIG. 3) embedded within the cartridge 54. As noted above, the connector pins 170 are received by a mating receptacle when the electrode cartridge 54 is inserted into the cartridge housing 52 (FIG. 1).

In one particular working model of the probe 20, the electrode cartridge 54 is formed of five concentric cylinders nested together. FIG. 5 depicts these five cylinders 110, 116, 124, 132 and 140 and illustrates how they are assembled to form the electrode cartridge 54. FIG. 5 also illustrates other important features of the cylinders, which are discussed below. First, however, the cylinders, which are separately illustrated in FIGS. 4A–4E, are described.

Figure 4A:
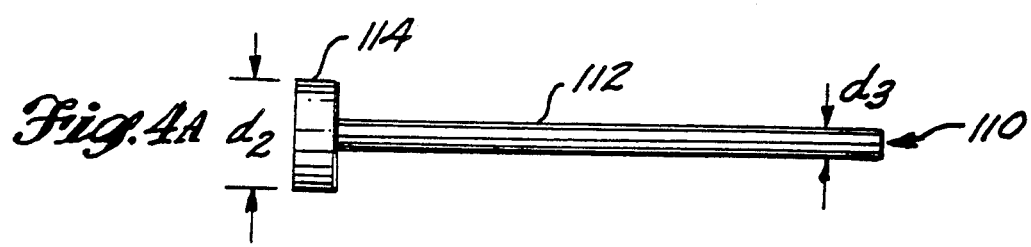
FIGS. 4A-4E are elevations of cylinders suitable for nesting together to form the electrode cartridge illustrated in FIG. 3.

FIG. 4A illustrates a lower hole cylinder 110 comprising: a solid shaft 112; and, a base 114. The shaft 112 is substantially cylindrical and has a diameter, designated $d_3$. The base 114 is substantially cylindrical and has a diameter, designated $d_2$. The base 114 is formed at one end of the shaft 112 and is coaxial with the shaft 112. The length of the base 114 is substantially less than the length of the shaft 112.

Figure 4B:
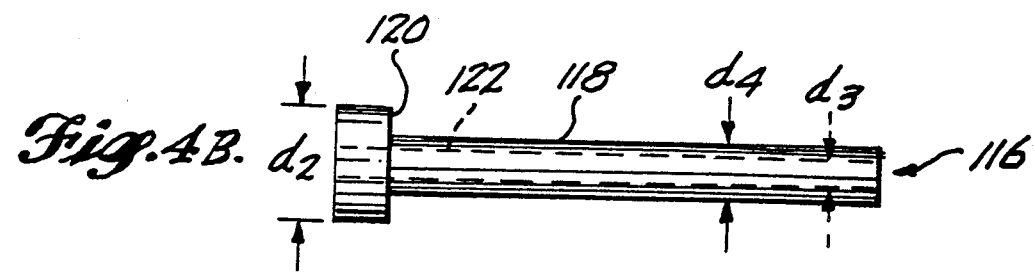

FIG. 4B illustrates an upper hole cylinder 116 comprising: a shaft 118; and, a base 120. The shaft 118 is substantially cylindrical and has a diameter, designated, $d_4$. The base 120 is substantially cylindrical and has a diameter equal to $d_2$. The base 120 is formed at one end of the shaft 118 and is coaxial with the shaft 118. The length of the base 120 is substantially less than the length of the shaft 118. A longitudinal bore 122 runs through the shaft 118 and the base 120, and has a diameter substantially equal to $d_3$.

Figure 4C:
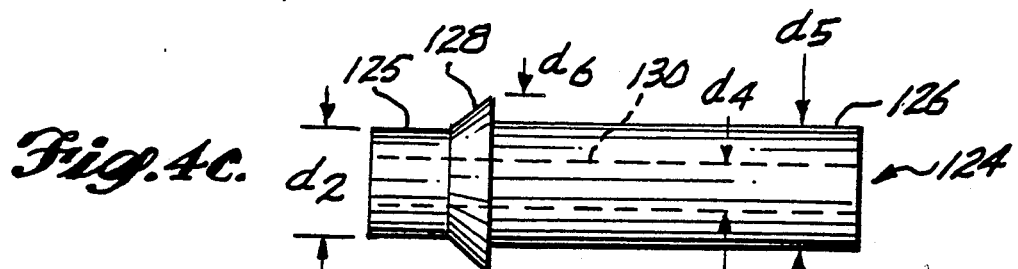

FIG. 4C illustrates a lower countersink cylinder 124 comprising: a shaft 126; a tapered collar 128; and, a base 125. The shaft 126 is substantially cylindrical and has a diameter, designated $d_5$. The tapered collar 128 has a frustoconical shape with a large diameter, designated $d_6$, and a small diameter equal to $d_2$. The tapered collar 128 is formed at one end of the shaft 126 and is coaxial with the shaft 126. The large diameter end of the tapered collar 128 is adjacent the end of the shaft 128. The base 125 is substantially cylindrical and has a diameter substantially equal to $d_2$. The base 125 is formed at the other end of the tapered collar 128 opposite the shaft 126. The shaft 126, the tapered collar 128, and the base 125 are coaxial. The lengths of the tapered collar 128 and the base 125 are substantially less than the length of the shaft 126. A longitudinal bore 130 runs through the shaft 126, the tapered collar 128 and the base 125 and has a diameter substantially equal to $d_4$.

Figure 4D:
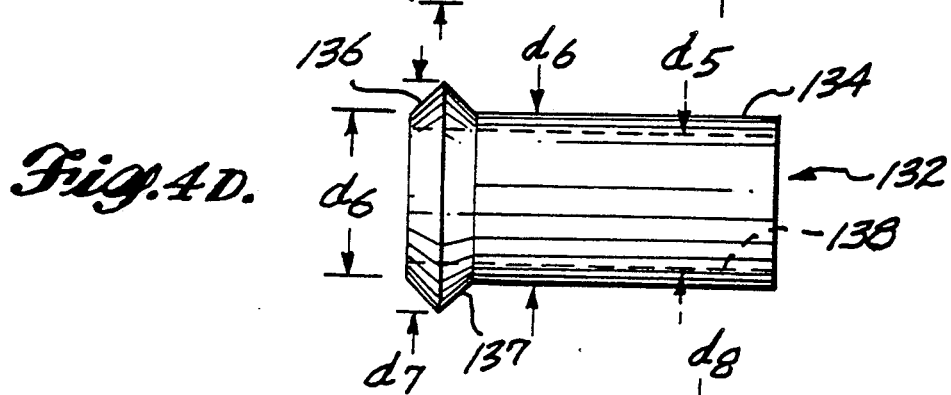

FIG. 4D illustrates an upper countersink cylinder 132 comprising: a shaft 134; a tapered collar 137; and, a tapered base 136. The shaft 134 is substantially cylindrical and has a diameter equal to $d_6$. The tapered collar 137 has a frustoconical shape. One end of the tapered collar 137 has a large diameter, designated $d_7$, and an opposite end has a small diameter equal to $d_6$. The tapered collar is formed at one end of the shaft 134 with the small diameter end adjacent the shaft 134. The tapered base 136 has a frustoconical shape. One end of the tapered base has a large diameter equal to $d_7$ and an opposite end has a small diameter equal to $d_6$. The tapered base 136 is formed at the end of the tapered collar 137 opposite the shaft 134. The large diameter end of the tapered base 136 is adjacent the large diameter end of the tapered collar 137. The shaft 134 of the tapered collar 137 and the tapered base are coaxial. The lengths of the tapered collar 137 and the tapered base 136 are substantially less than the length of the shaft 134. A longitudinal bore 138 runs through the shaft 134, tapered collar 137 and tapered base 136 and has a diameter substantially equal to $d_5$.

Figure 4E:
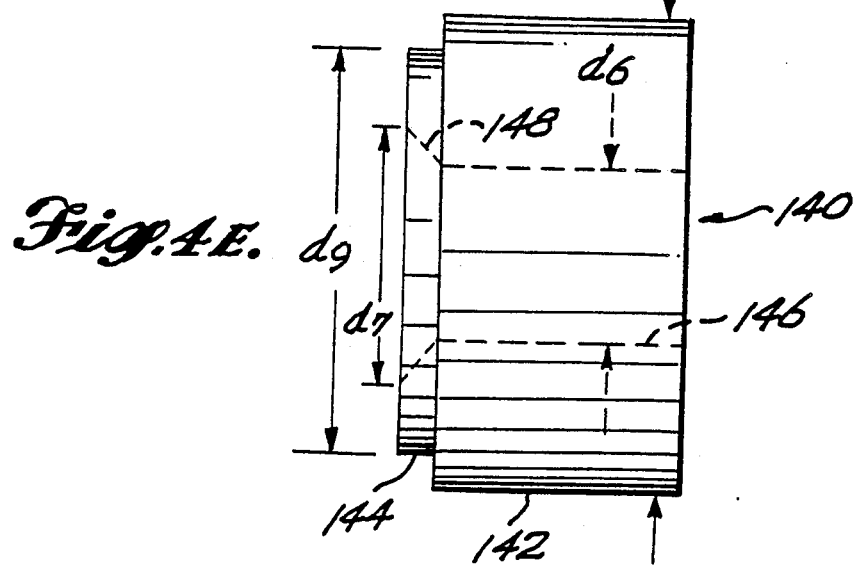

FIG. 4E illustrates an outer cylinder 140 comprising: a shaft 142; and, a neck 144. The shaft 142 is substantially cylindrical and has a diameter, designated $d_8$. The neck 144 is formed at one end of the shaft 142 and has a diameter, designated $d_9$. The neck 144 is coaxial with the shaft 142 and has a length that is substantially less than the length of the shaft 142. A longitudinal bore 146 runs through the shaft 142 and neck 144 and has a diameter substantially equal to $d_6$. The bore 146 has a flared portion 148 that flares outwardly beginning at the end of the neck 144 adjacent the end of the shaft 142 and ending at the end of the neck 144 opposite the shaft 142. The flared portion 148 of the bore 146 has a diameter substantially equal to $d_7$ at the end of the neck 144 opposite the shaft 142.

The various diameters of the cylinders discussed above are related to one another in the following manner:

$d_3 < d_4 < d_5 < d_6 < d_7 < d_9 < d_8$; and, $d_4 < d_2 < d_6$.

Because of the above-noted relationships, the five cylinders 110, 116, 124, 132 and 140 depicted in FIGS. 4A–4E can be concentrically nested together to form the electrode cartridge 54. More specifically, and as further illustrated in FIG. 5, when assembled, the shaft 112 of the lower hole cylinder 110 is inserted into the bore 122 of the upper hole cylinder 116 so that the base 114 of the lower hole cylinder 110 is adjacent the base 120 of the upper hole cylinder 116. The shaft 118 of the upper hole cylinder 116 is inserted into the bore 130 of the lower countersink cylinder 124 so that the base 120 of the upper hole cylinder 116 is adjacent the base 125 of the lower countersink cylinder 124. The shaft 126 of the lower countersink cylinder 124 is inserted into the bore 138 of the upper countersink cylinder 132 so that the tapered collar 128 of the lower countersink cylinder 124 is adjacent the tapered base 136 of the upper countersink cylinder 132. The shaft 134 of the upper countersink cylinder 132 is inserted into the bore 146 of the outer cylinder 140 so that the tapered collar 137 of the upper countersink cylinder 132 is seated in the outwardly tapered portion 148 (not shown in FIG. 5) of the bore 146 in the base 144 of the outer cylinder 140.

The cylinders of one working model of the embodiment of the invention described above are machined from Delrin ™, a high dielectric thermoplastic manufactured by E. I. DuPont de Nemours and Co. Obviously, it is to be understood that other machinable (or moldable) dielectric materials may be used to form the cylinders.

As discussed above, the probe 20 uses a fringing capacitance technique to measure the distance between the probe 20 and the wall of the countersunk hole 21. As will become better understood from the following discussion, the probe 20 contains a plurality of measuring electrodes and one or more grounding electrodes that, along with the wall of the countersunk hole 21, form fringe field capacitors. In the illustrated embodiment of the present invention, distance measurements between the probe 20 and the wall of the countersunk hole 21 are made at sixteen different points whose positions are defined by the location of sixteen measuring electrodes. More specifically, when the probe 20 is inserted into a countersunk hole 21, the distance between the probe 20 and the wall of the hole 24 is measured at eight different points and the distance between the probe 20 and the wall of the countersink 26 is also measured at eight different points, the locations of which are determined by the location of measuring electrodes. As discussed next, the sixteen different measuring electrodes and one grounding electrode are embedded in the electrode cartridge 54.

Preferably, the measuring and grounding electrodes are formed on the cylinders of the cartridge 54 by a vapor deposition process. The electrodes are formed by the ends of thin strips of a conductive material, such as copper, for example, deposited at various locations on the different cylinders. As illustrated in FIG. 5 and discussed more fully below, four measuring electrode strips 72, deposited on the outer surface of the inner hole cylinder 110, are used to measure a lower portion of the hole 24 and four measuring electrode strips 70, deposited on the outer surface of the upper hole cylinder 116, are used to measure an upper portion of the hole 24. Likewise, four measuring electrode strips 68, deposited on the outer surface of the lower countersink cylinder 124, are used to measure a lower portion of the countersink 26 and four measuring electrode strips 66, deposited on the outer surface of the upper countersink cylinder 132, are used to measure an upper portion of the countersink 26. The grounding electrode strip is preferably deposited on the outer surface of the upper hole cylinder 116 along with the four measuring electrode strips 70. A more detailed discussion of the location of the electrode strips is presented next.

The four lower hole electrode strips 72 are formed on the shaft 112 and base 114 of the inner hole cylinder 110. The lower hole electrode strips 72 are substantially parallel to one another lengthwise along the shaft 112 and extend radially on the adjacent surface of the base 114. Fringing capacitor electrodes are formed at the ends or tips of the radial extensions, which terminate at the edge of the base 114. Preferably, the four electrode strips 72 are spaced evenly about the circumference of the shaft 112 and the base 114 such that the electrode tips 73 are located at 90° intervals about the base 114. Similarly, four upper hole electrode strips 70 and a grounding electrode 158 are deposited along the shaft 118 and the adjacent surface of the base 120 of the upper hole cylinder 116. As with the lower hole electrodes 72, the upper hole electrode strips 70 are preferably located at 90° intervals about the shaft 118 and base 120. Thus, fringing capacitor electrodes, formed at the tips 71 of the electrode strip extensions, are spaced 90° from one another. The grounding electrode strip 158 runs substantially parallel to the upper hole electrode strips 70 along the shaft 118 and extends radially outwardly to the outer edge of the base 120. The grounding electrode strip 158 is preferably located equidistantly between two adjacent upper hole electrode strips 70. Thus, the grounding electrode tip 160, formed at the end of the grounding electrode strip 158, is located between an adjacent pair of upper hole electrode tips 71.

The four lower countersink electrode strips 68 are deposited along the shaft 126 and the tapered collar 128 of the lower countersink cylinder 124. The lower countersink electrode strips 68 are substantially parallel to one another along the shaft 126 and extend radially outwardly on the adjacent surface of the collar 128. Fringing capacitor electrodes are formed at the tips 69 of the radial extensions, which terminate at the edge of the collar 128. The electrode strips 68 are preferably located at 90° intervals about the shaft 126 and collar 128. Thus, the electrode tips 69 are spaced 90° from one another. Similarly, the four upper countersink electrode strips 66 are deposited along the shaft 134 and tapered collar 137 of the upper countersink cylinder 132. As with the lower countersink electrode strips 68, the upper countersink electrode strips 66 are preferably located at 90° intervals about the shaft 134 and the collar 137. Thus, the lower countersink electrode tips 69 are spaced 90° from one another.

The measuring and grounding electrode strips 66, 68, 70, 72 and 158 are sufficiently thin to permit the cylinders 110, 116, 124, 132 and 140 to be concentrically nested together in the manner discussed above. Once the electrodes have been deposited upon the cylinders, the cylinders, preferably, are cemented together so that the electrode cartridge 54 becomes substantially a single structure having the form illustrated in FIG. 3. As a result, the electrode tips (67, 69, 71 and 73) are located in four spaced-apart circumferential rows about the assembled electrode cartridge 54.

Figure 6:
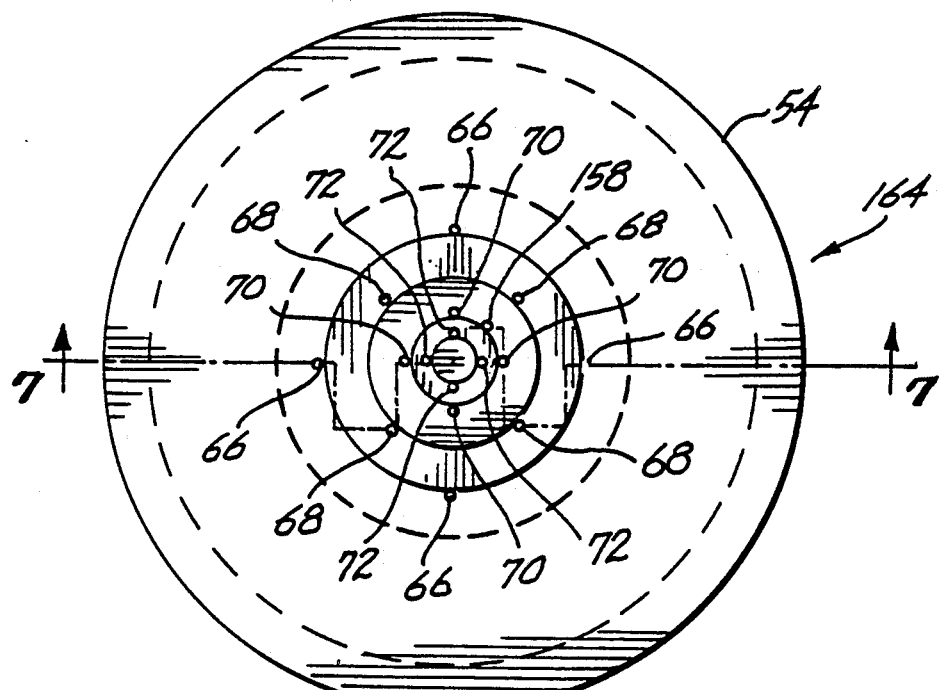
FIG. 6 is an elevation of the back of the electrode cartridge illustrated in FIG. 3.

FIG. 6 is an elevation of the back 164 of the electrode cartridge 54 and illustrates the arrangement of the ends of the electrode strips 66, 68, 70, 72 and 158 that are connected to the control unit 30 via the cable 36 (FIG. 2). For purposes of clarity, the connector pins 170 attached to this end of the electrode strips are not shown in FIG. 6. As can be seen from FIG. 6, the four upper countersink electrode strips 66, the four upper hole electrode strips 70 and the four lower hole electrode strips 72 are arcuately aligned with one another. That is, in the above arrangement, assuming that one of the upper countersink electrode strips 66 is located at a reference point of 0°, the remaining three upper countersink electrode strips 66 are arcuately located at 90°, 180° and 270°, respectively. Likewise, the upper hole electrode strips 70 and the lower hole electrode strips 72 are also arcuately located at 0°, 90°, 180° and 270°.

The lower countersink electrode strips 68 are not aligned with the other electrodes and are located at points equidistant to the other electrodes. In the above arrangement, the lower countersink electrode strips 68 are arcuately located at 45°, 135°, 225° and 315°. This arrangement provides improved isolation between the lower countersink electrode strips 68 and the upper hole and upper countersink electrode strips 70 and 66, which, in turn, improves the accuracy and reliability of the probe 20. In keeping with the above electrode arrangement, the grounding electrode strip 158 is arcuately located at 45°. It is to be understood that the above arrangement of electrode strips is merely an exemplary arrangement and that other electrode strip arrangements may be utilized.

Figure 7:
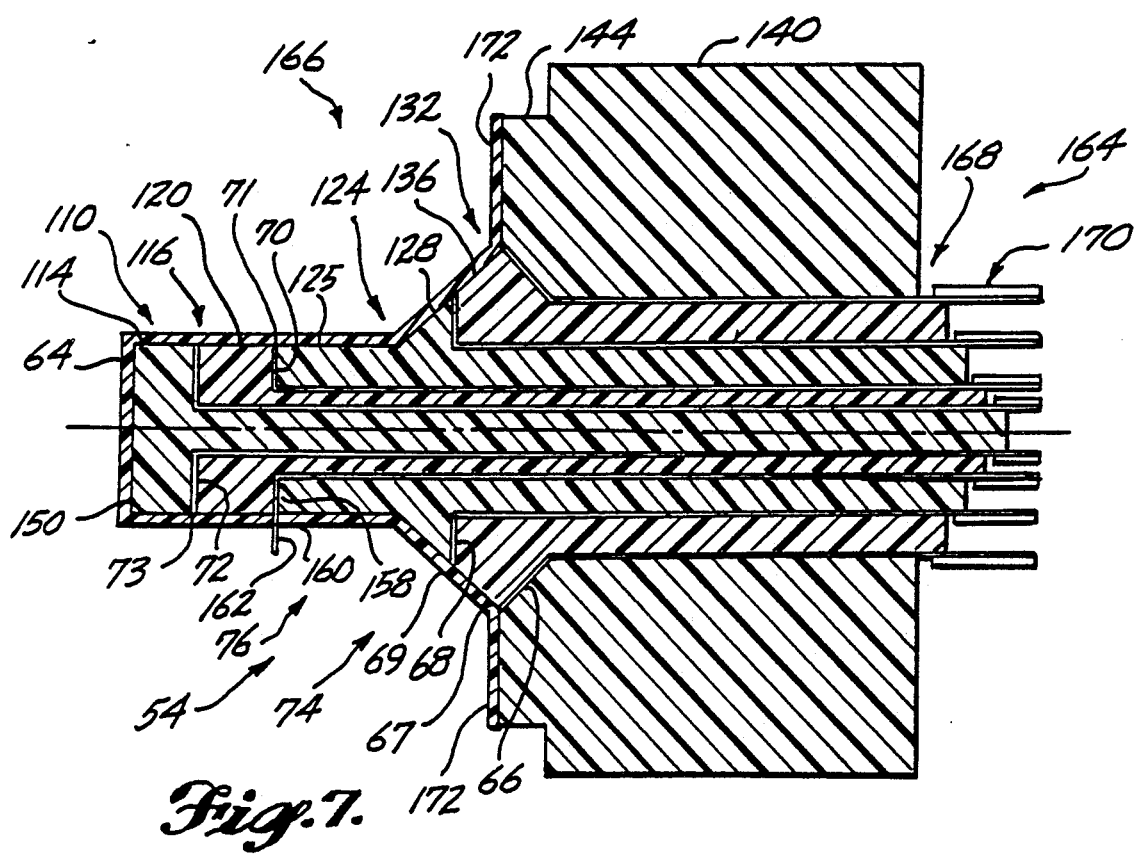
FIG. 7 is a sectional view taken substantially through the center of the electrode cartridge depicted in FIG. 6, specifically along line 7—7.

FIG. 7 is a section of the electrode cartridge 54 taken substantially through the center of the cartridge 54, specifically along line 7—7 of FIG. 6. As can be seen in FIG. 7, the sixteen measuring electrode strips 66, 68, 70 and 72 and the grounding electrode strip 158 are sandwiched between the cylinders 110, 116, 124, 132 and 140 of the assembled electrode cartridge 54. More specifically, the four lower hole electrode strips 72 are sandwiched between the lower and upper hole cylinders 110 and 116. The four lower hole electrode tips 73 are flush with an outer surface 150 of the cartridge 54 formed by the adjacent bases 114 and 120 of cylinders 110 and 116, respectively. The four upper hole electrode strips 70 are sandwiched between the upper hole cylinder 116 and the lower countersink cylinder 124. The four upper hole electrode tips 71 are flush with the outer surface 150 of the cartridge 54 formed by the adjacent bases 120 and 125 of cylinders 116 and 124, respectively. The four lower countersink electrode strips 68 are sandwiched between the lower and upper hole cylinders 124 and 132. The four lower countersink electrode tips 69 are flush with the outer surface 150 of the cartridge 54 formed by the adjacent tapered collar 128 and tapered base 136 of cylinders 124 and 132, respectively. The four upper countersink electrode strips 66 are sandwiched between the upper countersink cylinder 132 and the outer cylinder 140. The four upper countersink electrode tips 67 are flush with the outer surface 150 of the cartridge 54 formed by the adjacent tapered collar 137 and base 144 of cylinders 132 and 140, respectively.

The grounding electrode strip 158 is sandwiched between the upper hole cylinder 116 and the lower countersink cylinder 124. The grounding electrode tip 160 is flush with the outer surface 150 of the cartridge 54 formed by the adjacent bases 120 and 125 of cylinders 116 and 124, respectively. A conducting wire 162, such as a copper wire, for example, is bonded to the tip 160 of the grounding electrode 158 and extends radially from the outer surface 150 of electrode cartridge 54.

As discussed above, the sixteen measuring electrode tips 67, 69, 71 and 73 are flush with the outer surface 150 of the electrode cylinder 54. The wire 162 attached to the grounding electrode tip 160 extends beyond the outer surface 150. After the cylinders have been nested together in the manner noted above, a thin dielectric layer 64 is applied to the outer surface 150 of the front 166 of the electrode cartridge 54. The dielectric layer 64 has a depth, designated $d_e$. The dielectric layer 64 protects the electrode tips 67, 69, 71 and 73 from physical damage. The dielectric layer 64 also protects the probe 20 from short-circuit currents that would be produced if the electrode tips 67, 69, 71 and 73 were to contact the countersunk hole 21 and thereby short one or more fringe field capacitors to ground. The wire 162 attached to the grounding electrode tip 160 extends beyond the dielectric layer 64 so that it can contact the wall of the hole 24 when the probe 20 is placed into the countersunk hole 21.

As noted above, and in accordance with the preferred embodiment of the invention, the electrode cartridge 54 is designed to measure a particular size countersunk hole 21. Accordingly the hole portion 76 and the countersink portion 74 of the electrode cartridge 54 are sized to fit precisely into a particular hole 24 and countersink 26, respectively. The hole portion 76 is formed by the bases 114, 120 and 125 of the lower and upper hole cylinders 110 and 116 and the lower countersink cylinder 124, respectively, and by the dielectric layer 64. Accordingly, the hole portion 76 has a diameter (i.e., $d_2+2d_e$), which is substantially equal to the nominal hole diameter, $d_h$, discussed above. The countersink portion 74 is formed by the tapered collar 128 and the tapered base 136 of the lower and upper countersink cylinders 124 and 132, respectively, and by dielectric layer 64. The countersink portion 74 has one end with a diameter (i.e., $d_2+2d_e$) substantially equal to the nominal hole diameter, $d_h$, and and an opposite end with a diameter (i.e., $d_7+2d_e$) substantially equal to the nominal countersink diameter, $d_c$. A distance between the ends of the countersink portion 74 is substantially equal to the nominal countersink depth, $d_1$, discussed above. Accordingly, each electrode cartridge 54 has dimensions substantially equal to the nominal dimensions of a particular countersunk hole 21 and can be used to measure only that particular size countersunk hole 21. As noted above, different size cartridges 34 can be used to measure different size countersunk holes 25 (FIG. 2).

Each of the measuring electrode strips 66, 68, 70 and 72 and the grounding electrode 158 have ends 168 opposite the respective electrode tips 67, 69, 71, 73 and 160. As illustrated in FIG. 7, the electrode ends 168 are located near the back 164 of the cartridge 54. As noted above, each of the electrode ends 168 is bonded to an electrical connector pin 170 that exits from the back end 164 of the electrode cartridge 54. As was also noted above, the pins 170 are received by a mating receptacle when the electrode cartridge is placed in the cartridge housing 52.

Figure 8A:
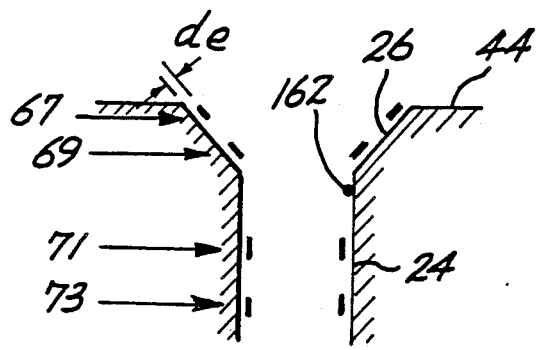
FIGS. 8A and 8B are schematic sectional views of perfect and defective countersunk holes illustrating the locations of the electrodes relative to the walls of the hole and countersink when a probe formed in accordance with the present invention is positioned in the countersunk holes.

FIG. 8A illustrates, in schematic form, the position of the electrode tips when the probe 20 is inserted into a perfect countersunk hole 21 (FIG. 1A). For purposes of clarity, only eight of the sixteen measuring electrode tips are illustrated. Each of the measuring electrode tips 67, 69, 71 and 73 is positioned away from the walls of the hole 24 and countersink 26 a distance substantially equal to the thickness of the dielectric layer 64 (i.e., $d_e$). The grounding electrode 150 is placed in contact with the wall of the hole 24 via the ground wire 162 and, thus, grounds the countersunk hole 21. As noted above, when the probe 20 is inserted into a countersunk hole (such as the perfect countersunk hole 21), the resting surface 172 (FIG. 7) of the electrode cartridge 54 is brought into contact with the part surface 44 surrounding the countersink 26 so that the probe 20 is substantially normal to the part surface 44. Furthermore, for the perfect countersunk hole 21 depicted in FIG. 8A, the electrode cartridge 54 is coaxial with the countersunk hole 21.

In order to measure the distance between the electrode cartridge 54 and the wall of the countersunk hole 21, a charging current is applied to the measuring electrode strips 66, 68, 70 or 72 by a device, such as the control unit 30 which, as noted above, does not form a part of the present invention. Preferably, the charging current is sequentially applied to each of the measuring electrodes. Further, as a charging current is applied to a measuring electrode, the remaining measuring electrodes are held at ground potential to reduce cross-talk and cross-capacitance between the measuring electrodes. Accordingly, only the fringe field capacitor associated with the particular measuring electrode receiving a charging current begins to charge up. As noted above, the fringe field capacitors charge up at a charging rate determined, in part, by the distance between the particular measuring electrode tip and the wall of the hole 24 or countersink 26. For example, if a charging current is applied to one of the lower hole electrode strips 72, the fringe field capacitor formed by the respective electrode tip 73 and the wall of the hole 24 begins to charge up. The charging rate is determined, in part, by the distance between the electrode tip 73 and the wall of the hole 24. This process is preferably repeated for each measuring electrode in the cartridge 54. With respect to the perfect countersunk hole 21 illustrated in FIG. 8A, the charging rates of all of the fringe field capacitors are substantially equal, because the electrode tips are located an equal distance (i.e., $d_e$) from the walls of the hole 24 and countersink 26.

Figure 8B:
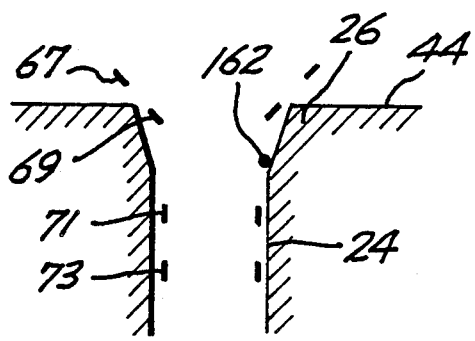

Any one of the situations illustrated in FIGS. 1B-1H would result in a variation in the distances between the wall of the countersunk hole 21 and one or more of the electrode tips 67, 69, 71 and 73. For example, FIG. 8B illustrates the positions of the electrode tips when the countersink diameter, $d_c$, is too small, i.e., less than the diameter of the fastener head (see FIG. 1B). In this example, the probe 20 will not sit all the way into countersunk hole 21. Since, in this example, the hole diameter, $d_h$, is correct, the diameter of hole portion 76 is substantially equal to the diameter of the hole 24. Accordingly, the hole portion 76 of the electrode cartridge 54 fits into the hole 24 and holds the probe 20 normal to the part surface 44. The lower and upper hole electrode tips 73 and 71 are located an equal distance (i.e., $d_e$) from the wall of the hole 24. However, since the countersink diameter is too small, the countersink portion 76 does not fit entirely within the countersink 26. As a result, the upper and lower countersink electrode tips 67 and 69 are located unequal distances from the wall of the countersink 21. Accordingly, the charging rate of the countersink fringe field capacitors will be different from one another and, most likely, different from the charging rate of the hole fringe field capacitors. The different charging rates of the fringe field capacitors indicate an imperfect countersunk hole 21. As noted above, the analysis of the charging rates is performed by the control unit 30 and does not form a part of the present invention.

Figure 9:
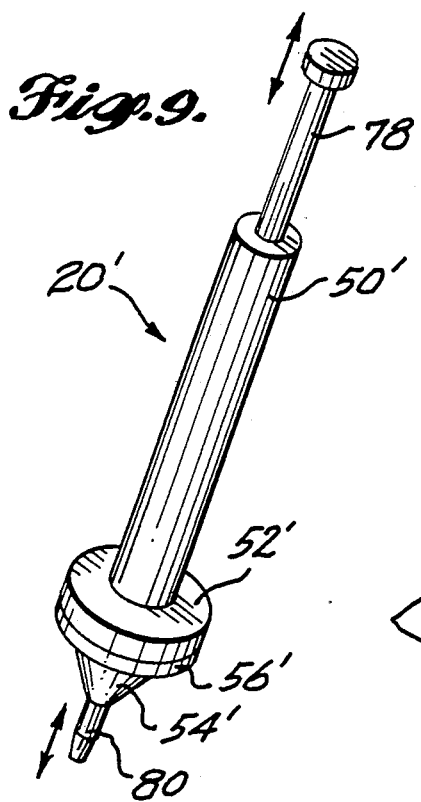
FIG. 9 is an isometric view of an alternative embodiment of the probe illustrated in FIG. 2; and, FIG. 10 is a partial isometric view of yet another alternative embodiment of the probe illustrated in FIG. 2.

An alternative embodiment of the present invention is illustrated in FIG. 9. In this embodiment, a hand-held probe 20' comprises: a handle 50'; a cartridge housing 52'; an electrode cartridge 54'; a retaining ring 56'; a cylindrical rod 78; and, a tapered end 80. The probe 20' is configured similarly to the preferred embodiment of the probe 20 discussed above and depicted in FIG. 2. That is, the electrode cartridge 54' is held in the cartridge housing 52' by the retaining ring 56'. The cartridge housing 52' is connected to one end of the handle 50'. The handle 50' and the electrode cartridge 54' have longitudinal cylindrical bores (not shown). The bore through the handle 50' is coaxial with the bore through the electrode cartridge 52'. The bores are sized to slidably receive the cylindrical rod 78 and the tapered end 80. The tapered end 80 is removably attached to an end of the rod 78. The rod 78 and tapered end are slidably positioned in the bores. Thus, the rod 78 and tapered end 80 can slide within the bores such that the tapered end 80 can be extended from or retracted into the electrode cartridge 54'. The tapered end 80 includes upper and lower hole electrodes 71' and 73' (not shown) and the electrode cartridge 54' includes upper and lower countersink electrodes 67' and 69' (also not shown). Thus, the tapered end 80 of this embodiment is functionally equivalent to the hole portion 76 of the preferred embodiment of the invention and the electrode cartridge 54' of this embodiment is functionally equivalent to the countersink portion 74 of the preferred embodiment of the invention.

The probe 20' may be inserted into a countersunk hole 21 in the following manner. The electrode cartridge 54' is positioned over the countersunk hole 21 and the rod 78 is slid through the bores in the handle 50' and cartridge 54' so that the tapered end 80 is received by the hole 24. Once the tapered end 80 has been inserted into the hole 24, the electrode cartridge 54' can be slid down over the rod 78 and seated in the countersink 26. Once the probe 20' is thus positioned, the fringe field capacitance technique described above is used to make distance measurements between the probe 20' and the wall of countersunk hole 21.

The tapered end 80 is removably attached to the rod 78 so that it may be replaced with a different size tapered end 80. The electrode cartridge 54' can also be replaced by another cartridge 54' having a different size. Thus, various tapered ends 80 and cartridges 54' can be combined in different ways to match different size countersunk holes 25 (FIG. 1).

Figure 10:
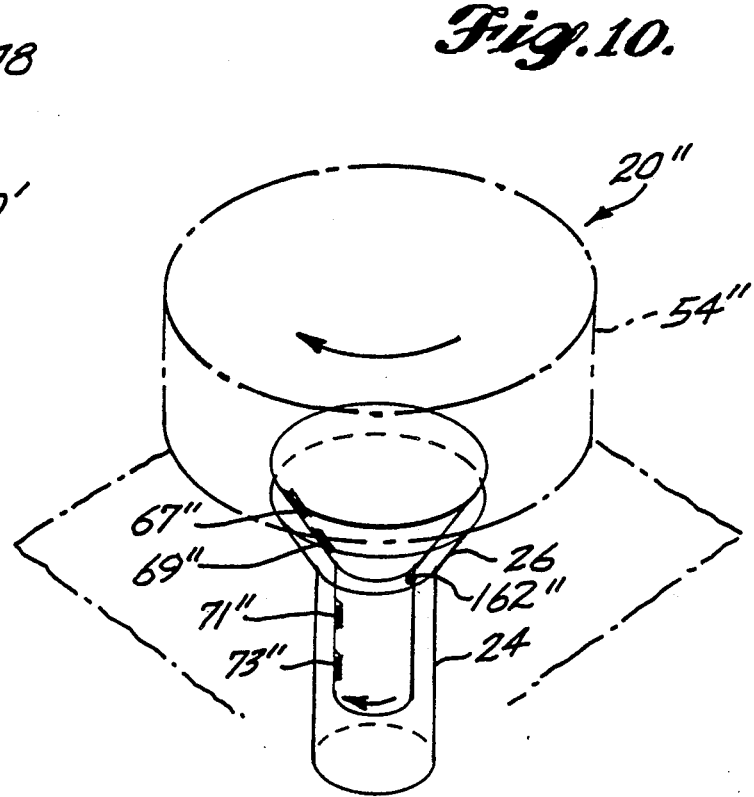

FIG. 10 illustrates a portion of yet another alternative embodiment of the present invention. A probe 20" has an electrode cartridge 54" that contains four measuring electrodes (not shown) and one grounding electrode (also not shown). The four electrodes included in this alternative embodiment include one upper countersink electrode, one lower countersink electrode, one upper hole electrode one lower hole electrode, a grounding electrode, and a ground wire. Corresponding electrode tips 67", 69", 71" and 73" are schematically illustrated in FIG. 10. In accordance with this alternative embodiment of the invention, the cartridge 54" is inserted into the countersunk hole 21 and incrementally rotated about its longitudinal axis. At each rotational increment, which may be every 90°, for example, distance measurements are made by the four associated fringe field capacitors in the manner set forth above. This embodiment may be difficult to implement in a hand-held version, accordingly, the probe 20" may be more easily used in conjunction with robotics. That is, the probe 20" could be attached to an industrial manufacturing robot that positions the cartridge 54" into the countersunk hole 21 and precisely rotates the probe 20" so as to obtain a sufficient number of distance measurements to enable the downstream devices (such as the control unit 30) to determine whether the geometry and orientation of the countersunk hole 21 are within engineering specifications.

As can be readily appreciated from the foregoing description, the invention provides a fringe field capacitance probe usable in a system designed to inspect a countersunk hole by measuring the distance between the probe and the wall of the countersunk hole. Electronics that form other parts of the system energize probe electrodes and make distance measurements by determining the charge rate. The charge rate is used to determine whether the geometry and orientation of the countersunk hole are within specifications. While a preferred and alternative embodiments of the invention have been illustrated and described herein, it is to be understood that, within the scope of the appended claims, various changes can be made. For example, more or less than sixteen measuring electrodes can be used in the probe and the measuring electrodes could be positioned differently within the cartridge than as described above. Similarly, more than one grounding electrode could also be used Likewise, a different method of grounding the part could also be implemented. While vapor deposition has been described as one technique for applying the electrode strips to the electrode cartridge, other methods, such as affixing thin strips of copper tape to the cylinders could also be used. Furthermore, the electrode cartridge could be assembled in a manner different than the nested cylinder approach described above. For example, a solid piece of material could be machined to the desired shape and holes could be drilled at appropriate points in the cartridge to receive thin conductive wires. Likewise, ceramic materials could be used for the electrode cartridge instead of a thermoplastic material. Hence, the invention can be practiced otherwise than as specifically described herein.

The embodiments of the invention in which an exclusive property or privilege is claimed are defined as follows:

1. A probe for inspecting holes in conductive bodies, said probe comprising:
   (a) a housing;
   (b) a dielectric body attached to said housing for insertion into a hole having a selected diameter, said body having an outer surface with a diameter less than the selected diameter;
   (c) at least one measuring electrode mounted in said body, said at least one measuring electrode having a tip located on the outer surface of said dielectric body suitable for forming a fringe field capacitor electrode;
   (d) a dielectric shell covering said dielectric body including said at least one measuring electrode tip, said shell having a thickness such that the diameter of the outer surface of said shell is substantially equal to said selected diameter; and,
   (e) a grounding electrode mounted in said dielectric body, said grounding electrode including a conductive element extending through said dielectric body and said dielectric shell for establishing a conductive path to a conductive body when said probe is mounted in a hole of said selected diameter formed in said conductive body.

2. The probe of claim 1, further including a plurality of measuring electrodes mounted in said dielectric body, each of said measuring electrodes having a tip.

3. The probe of claim 2, wherein said measuring electrode tips are arranged in a plurality of spaced-apart circumferential rows about said dielectric body.

4. The probe of claim 3, wherein said grounding electrode conductive element is included in one of said circumferential rows of said measuring electrode tips.

5. The probe of claim 3, wherein said spaced-apart circumferential rows of measuring electrode tips are substantially parallel.

6. The probe of claim 5, wherein said dielectric body comprises a plurality of concentrically nested dielectric cylinders, at least two of said cylinders each having a cylindrical shaft and a cylindrical base adjacent one end of said cylindrical shaft and said measuring electrode tips are disposed around the outer perimeter of said cylindrical base.

7. The probe of claim 6, wherein said probe is adapted to measure holes having a countersink wherein said dielectric body further includes a lower countersink dielectric cylinder having a cylindrical shaft, a tapered collar having a frustoconical shape, a stepped section perpendicular to said cylindrical shaft wherein said measuring electrode tips are disposed around said perimeter of said stepped section, and an upper countersink cylinder having a cylindrical shaft, a tapered collar having a frustoconical shape adjacent one end of said shaft, a tapered base having a frustoconical shape adjacent one end of said tapered collar opposite said shaft, said frustoconical shape of said tapered base opposing said frustoconical shape of said tapered collars, and a longitudinal bore through said shaft, collar, and base said bore having a diameter suitable for receiving said cylindrical shaft of said lower countersink cylinder.

8. The probe of claim 2, wherein:
   (a) said dielectric body further includes:
      (i) a cylindrical hole portion, the diameter of the outer surface of said hole portion being said selected diameter; and
      (ii) a countersink portion having an outer surface having a frustoconical shape at all points greater in diameter than the diameter of said hole portion outer surface; and
   (b) said at least one measuring electrode mounted on said body includes:
      (i) at least one hole measuring electrode having a tip located on the outer surface of said hole portion of said dielectric body; and
      (ii) at least one countersink measuring electrode having a tip located on the outer surface of said countersink portion of said dielectric body; and
   (c) said dielectric shell covers said countersink portion and said body portion including said measuring electrode tips.

9. The probe of claim 8, further including a plurality of hole measuring electrodes and a plurality of countersink measuring electrodes mounted respectively on said hole and countersink portions of said dielectric body.

10. The probe of claim 9, wherein said plurality of hole and countersink measuring electrodes are arranged in a plurality of spaced-apart circumferential rows about said dielectric body.

11. The probe of claim 10, wherein said grounding electrode conductive element is aligned with one of said circumferential rows of hole measuring electrodes.

12. The probe of claim 10, further including at least two spaced-apart circumferential rows of countersink measuring electrodes.

13. The probe of claim 10, further including a plurality of spaced-apart circumferential rows of hole measuring electrodes.

14. The probe of claim 13, further including a plurality of spaced-apart circumferential rows of countersink measuring electrodes.

15. The probe of claim 14, wherein said grounding electrode conductive element is aligned with one of said circumferential rows of hole measuring electrodes.

16. A probe for inspecting holes formed in conductive bodies, the holes having a countersink, said probe comprising:
   (a) a housing; and
   (b) a dielectric body attached to said housing including:
      (i) a cylindrical hole portion for insertion into a hole having a selected diameter, said hole portion having an outer surface with a diameter less than the said selected diameter and including at least one hole measuring electrode, said at least one hole measuring electrode having a tip positioned on said hole portion outer surface so as to form a fringe field capacitor electrode; and
      (ii) a countersink portion integral with one end of said hole portion for insertion into a frustoconically shaped countersink, said countersink portion having a frustoconically shaped outer surface and including at least one countersink measuring electrode, said at least one countersink measuring electrode having a tip positioned on said countersink outer surface so as to form a fringe field capacitor electrode.

17. The probe of claim 16, further including a plurality of hole measuring electrodes and a plurality of countersink measuring electrodes mounted, respectively on said hole and countersink portions of said dielectric body, each of said hole measuring electrodes and countersink measuring electrodes having a tip.

18. The probe of claim 17, wherein said hole measuring electrode tips are arranged in at least one circumferential row about said dielectric body and said countersink measuring electrodes are arranged in at least one circumferential row about said dielectric body.

19. The probe of claim 18, wherein said dielectric body further includes at least two circumferential rows of measuring electrode tips and said rows are substantially parallel.

20. The probe of claim 19, wherein said dielectric body comprises a plurality of concentrically nested dielectric cylinders, at least two of said cylinders each having a cylindrical shaft, and a cylindrical base adjacent one end of said cylindrical shaft and said measuring electrode tips are disposed about the outer perimeter of said cylindrical base.

21. The probe of claim 20, wherein said dielectric body further includes a lower countersink dielectric cylinder having a cylindrical shaft, a tapered collar having a frustoconical shape, a stepped section perpendicular to said cylindrical shaft wherein said countersink measuring electrode tips are disposed around said perimeter of said stepped section, and an upper countersink cylinder having a cylindrical shaft, a tapered collar having a frustoconical shape adjacent one end of said shaft, a tapered based having a frustoconical shape adjacent one end of said tapered collar opposite said shaft, said frustoconical shape of said tapered base opposing said frustoconical shape of said tapered collar, and a longitudinal bore through said shaft, collars and said bore having a diameter suitable for receiving said cylindrical shaft of said lower countersink cylinder.

22. The probe of claim 21, further including a dielectric shell exposed over said dielectric body hole portion and said countersink portion and covering said measuring electrode tips.

23. The probe of claim 22, further including a grounding electrode mounted inside said dielectric body, said grounding electrode having a conductive element mounted thereto extending through said dielectric body and said dielectric shell and dimensioned to establish a conductive path with the conductive body defining the hole.

24. The probe of claim 23, wherein said grounding electrode conductive element is aligned with said hole measuring electrode tips disposed around the outer perimeter of said cylindrical base of one of said cylindrical shafts.

* * * * *